US008708485B2

(12) United States Patent
Marin et al.

(10) Patent No.: US 8,708,485 B2
(45) Date of Patent: Apr. 29, 2014

(54) METHOD FOR PROVIDING A SPECTACLE OPHTHALMIC LENS BY CALCULATING OR SELECTING A DESIGN

(75) Inventors: Gildas Marin, Charenton le Pont (FR); Martha Hernandez, Charenton le Pont (FR); Thierry Bonnin, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 0 days.

(21) Appl. No.: 13/508,528

(22) PCT Filed: Nov. 15, 2010

(86) PCT No.: PCT/EP2010/067498
§ 371 (c)(1),
(2), (4) Date: May 7, 2012

(87) PCT Pub. No.: WO2011/058177
PCT Pub. Date: May 19, 2011

(65) Prior Publication Data
US 2012/0229758 A1     Sep. 13, 2012

(30) Foreign Application Priority Data

Nov. 13, 2009  (EP) .................................. 09306095

(51) Int. Cl.
*G02C 7/02*  (2006.01)

(52) U.S. Cl.
USPC ............. 351/159.52; 351/159.73; 351/159.74

(58) Field of Classification Search
USPC ............................ 351/159.07–159.1, 159.52, 351/159.76–159.79, 225, 226, 235, 236, 351/241
See application file for complete search history.

(56) References Cited

U.S. PATENT DOCUMENTS

| 4,105,302 A | * | 8/1978 | Tate, Jr. .......................... 351/210 |
| 2005/0254007 A1 | * | 11/2005 | Wang et al. .................... 351/177 |
| 2006/0166609 A1 | * | 7/2006 | Siders et al. .................... 451/41 |
| 2007/0097318 A1 | * | 5/2007 | Chehab et al. ................. 351/211 |
| 2008/0273170 A1 | * | 11/2008 | Watanabe ....................... 351/177 |
| 2009/0073384 A1 | * | 3/2009 | Warden et al. ................. 351/221 |
| 2010/0002191 A1 |   | 1/2010 | Drobe |

FOREIGN PATENT DOCUMENTS

| EP | 1-970-689 A2 | 9/2008 |
| WO | 2008/104695 A1 | 9/2008 |
| WO | 2009/043941 A1 | 4/2009 |
| WO | 2009/044080 A2 | 4/2009 |

OTHER PUBLICATIONS

Bach, "The Freiburg Visual Acuity Test—Automatic Measurement of Visual Acuity," *Optometry and Vision Science* 73(1):49-53, Jan. 1, 1996.

* cited by examiner

*Primary Examiner* — Evelyn A Lester
*Assistant Examiner* — William Alexander
(74) *Attorney, Agent, or Firm* — Seed IP Law Group PLLC

(57) ABSTRACT

A method for providing a spectacle ophthalmic lens to a wearer, the method comprising the following consecutive steps: measuring the visual acuity value(s), VA, of the eye(s) of the wearer or the binocular visual acuity value, $VA_{bino}$, of both eyes of the wearer where the eye(s) of the wearer is (are) substantially free of low order aberrations or is (are) corrected of low order aberrations; calculating thanks to computer means a design of the spectacle ophthalmic lens or selecting a design in a spectacle ophthalmic lens design data base by adapting the management of residual astigmatism based on the measured visual acuity value(s) of the eye(s) of the wearer.

14 Claims, 4 Drawing Sheets

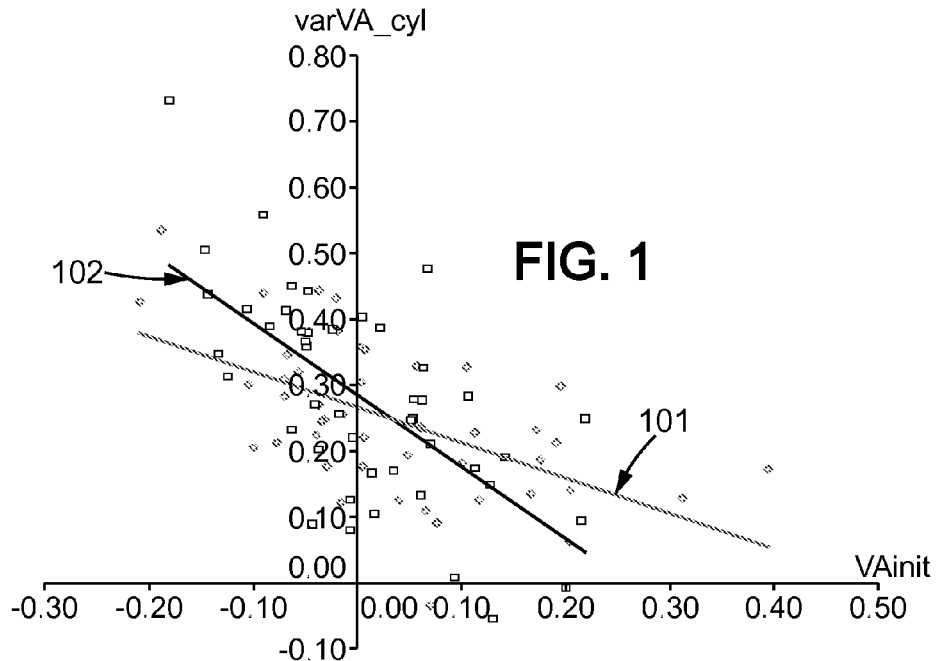
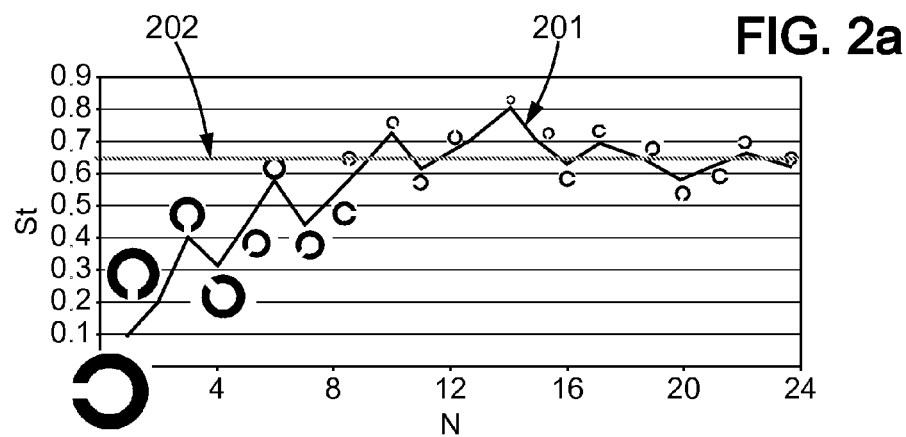
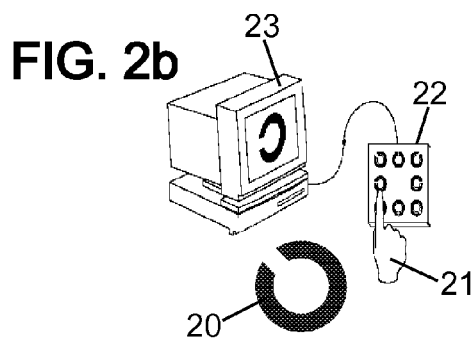

METHOD FOR PROVIDING A SPECTACLE OPHTHALMIC LENS BY CALCULATING OR SELECTING A DESIGN

BACKGROUND

1. Technical Field

The invention relates generally to the field of vision improvement and more specifically concerns a method for providing an spectacle ophthalmic lens by calculating or selecting a design. The spectacle ophthalmic lens can be, e.g., a progressive lens, a unifocal lens. The invention also concerns a method for making a spectacle ophthalmic lens. Furthermore, the invention concerns a piece of software set up for implementing the calculation method for the design of a spectacle ophthalmic lens of the invention.

2. Description of the Related Art

Spectacle ophthalmic lenses are worn and widely used for correcting many different types of vision deficiencies. These include defects such as near-sightedness (myopia) and far-sightedness (hypermetropia), astigmatism, and defects in near-range vision usually associated with aging (presbyopia).

Ophthalmologists or optometrists routinely improve the visual acuity by correcting refractive errors in terms of sphere, cylinder and axis. Said refractive errors are low order aberrations.

Astigmatism is a geometrical aberration converting the image of a point into two perpendicular straight lines (sagittal and tangential focals). The distance between these two straight lines represents the astigmatism value of the optical system, and their orientation is the astigmatism axis.

Astigmatism occurs when the refractive error in an eye is meridian-dependent. This is usually due to one or more refractive surfaces, most commonly the anterior cornea, having a toroidal shape. The astigmatic refractive error is a second-order aberration.

The astigmatism of an optical system is due both to locally toric surfaces and to the oblique character of rays (when image and object are beyond the axis). Complex surface such as in progressive lens are generating astigmatism aberration that varies at each point of the lens. The difference between the astigmatism of the lens and the prescribed astigmatism corresponding to the refractive error of the eye is called the residual astigmatism.

Document WO2009/043941 discloses a method for providing a spectacle ophthalmic lens to a wearer comprising the step of measuring high order aberrations (HOA) of an eye and calculating or selecting the said spectacle ophthalmic lens design based on the HOA measurement.

SUMMARY

A problem that the invention aims to solve is to better meet the visual needs of lens users and improve the comfort of lens users, particularly users of progressive lenses, and facilitate their adapting to the lenses.

For this purpose, one subject of the invention is a method for providing a spectacle ophthalmic lens to a wearer, the method comprising the following consecutive steps:

a) providing the wearer with an ophthalmic correction device so as to correct the low order (spherical and/or cylindrical) aberrations of an eye (the eyes) of the wearer if said aberrations are greater to 0.25 Diopter;

b) measuring the visual acuity value(s), VA, of the eye(s) of the wearer or the binocular visual acuity value, $VA_{bino}$, of both eyes of the wearer where the eye(s) of the wearer is (are) substantially free of low order aberrations or is (are) corrected according to step a);

c) calculating thanks to computer means a design of the spectacle ophthalmic lens or selecting a design in a spectacle ophthalmic lens design data base by adapting the management of residual astigmatism based on the measured visual acuity value(s) of step b).

Said method is thus at least partly implemented through computer means.

According to the present invention, "providing a spectacle ophthalmic lens to a wearer", relates to offering to a given wearer a spectacle ophthalmic lens which fits the prescription data for said wearer and where a spectacle lens design has been determined for said wearer.

According to the present invention, "adapting the management of residual astigmatism based on a measured visual acuity value(s)", relates to defining rules suitable to establish a link between a measured visual acuity value(s) for a given wearer and residual astigmatism of the spectacle ophthalmic lens that will be provided to said wearer. Thanks to said link, a spectacle lens design can determined for said wearer.

According to an embodiment of the present invention, "adapting the management of residual astigmatism based on a measured visual acuity value(s)" means that the maximum allowable level of residual astigmatism is defined for a given gaze direction and said level is defined for a given visual acuity value.

According to an embodiment of the present invention, measuring the visual acuity value(s), VA, of the eye(s) of the wearer or the binocular visual acuity value, $VA_{bino}$, of both eyes of the wearer relates to measuring the maximal visual acuity value(s) of said eye(s).

A man skilled in the art knows that the measurement of the visual acuity value(s), VA, of the eye(s) of the wearer or the binocular visual acuity value, $VA_{bino}$, of both eyes of the wearer is implemented for at least a given distance. Said distance can be, for example but not limited to, the distance corresponding to far vision, and/or to intermediate vision and/or to near vision. In the frame of the present invention a "design" of a spectacle ophthalmic lens has to be understood as the part of the optical system of said lens which is not determined by the wearer standard prescription parameters consisting of sphere, cylinder, axis and power addition values determined for said wearer. The wording "design" relates thus to the optical function that results from the aberrations repartition according to different gaze directions passing trough the Eye Rotation Centre of the wearer. Astigmatism gradient can be considered as being an example of an indicator related to the aberrations repartition.

In the frame of the present invention, an eye of a wearer is substantially free of low order aberrations when the value of said aberrations is equal to or less than 0.25 Diopter.

Spectacle ophthalmic lenses, and particularly progressive lens, are fraught with residual aberrations, mostly astigmatism. Thus, the invention provides for customizing the management of residual astigmatism based on visual acuity measurement of the user eye(s) and thus optimizing the acuity/distortion compromise. In fact, the inventors were able to verify that the impact of residual astigmatism on vision depends on the level of visual acuity of the wearer.

It has to be underlined that no direct or indirect link can be established between the teaching of document WO2009/043941 and the present invention. High order aberrations (HOA) relate to third and above order of aberrations, whereas visual acuity incorporates all the order of aberrations and is dependent on neuronal treatment of the visual signal for a given wearer. High order aberrations (HOA) and visual acuity thus relate to two independent visual performance characteristics for a given wearer.

According to embodiments of the present invention, the calculation or selection of the design for the wearer relates to one eye or both eyes of the wearer.

According to another embodiment, the calculation or selection of the design for the wearer relates to binocular vision.

Visual acuity (VA) is acuteness or clearness of vision, which is dependent on the sharpness of the retinal focus within the eye and the sensitivity of the interpretative faculty of the brain.

The visual acuity is the size of the gap (measured in arc minutes) of the smallest detail that can be reliably identified, in other words, the Minimum Angle of Resolution (MAR). In the decimal system, the acuity is defined as the reciprocal value of this gap. A value of 1.0 is equal to 20/20.

The visual cortex is the part of the cerebral cortex in the posterior part of the brain responsible for processing visual stimuli, called the occipital lobe. The central 10° of field (approximately the extension of the macula) is represented by at least 60% of the visual cortex. Many of these neurons are believed to be involved directly in visual acuity processing.

The eye is connected to the visual cortex by the optic nerve coming out of the back of the eye. The two optic nerves of the eyes come together at the optic chiasm, where about half of the fibres from each eye cross over to the opposite side and join fibres from the other eye representing the corresponding visual field, the combined nerve fibres from both eyes forming the optic tract. This ultimately forms the physiological basis of binocular vision. The tracts project to a relay station in the midbrain called the lateral geniculate nucleus, which is part of the thalamus, and then to the visual cortex along a collection of nerve fibres called the optic radiations.

Measuring visual acuity is a simple test in accessing the health of the eyes, the visual brain, or pathway to the brain.

According to an embodiment, visual acuity, VA, is a quantitative measure of the ability to identify black symbols on a white background (optotype) at a standardized distance as the size of the symbols is varied. It is the most common clinical measurement of visual function. In the term "20/20 vision" the numerator refers to the distance in feet from which a person can reliably distinguish a pair of objects. The denominator is the distance from which an 'average' person would be able to distinguish—the distance at which their separation angle is 1 arc minute. The metric equivalent is 6/6 vision where the distance is 6 meters. Twenty feet is essentially infinity from an optical perspective (the difference in optical power required to focus at 20 feet versus infinity is only 0.164 Diopters). For that reason, 20/20 vision can be considered nominal performance for human distance vision; 20/40 vision can be considered half that acuity for distance vision and 20/10 vision would be twice normal acuity. The 20/x number does not directly relate to the eyeglass prescription required to correct vision; rather an eye exam seeks to find the prescription that will provide at least 20/20 vision.

Visual acuity can be for example measured by an eye care practitioner or an ophthalmologist according to the size of letters viewed on a Snellen chart or the size of other symbols, such as Landolt Cs or Tumbling E.

Using the foot as a unit of measurement, (fractional) visual acuity is expressed relative to 20/20. Otherwise, using the meter, visual acuity is expressed relative to 6/6. For all intents and purposes, 6/6 vision is equivalent to 20/20.

LogMAR is another commonly used scale which is expressed as the logarithm of the minimum angle of resolution. LogMAR scale converts the geometric sequence of a traditional chart to a linear scale. It measures visual acuity loss; positive values indicate vision loss, while negative values denote normal or better visual acuity. This scale provides a more scientific equivalent for the traditional clinical statement of "lines lost" or "lines gained", which is valid only when all steps between lines are equal, which is not usually the case.

When visual acuity is below the largest optotype on the chart, either the chart is moved closer to the patient or the patient is moved closer to the chart until the patient can read it. Once the patient is able to read the chart, the letter size and test distance are noted.

Aberration of an eye can be determined using wavefront measurements, including sphere, cylinder (which are "low" aberrations) and the higher order aberrations.

The wavefront can be analysed using Zernike polynomials. Such an analysis is for example recommended by the Optical Society of America (OSA) for describing ocular wavefront aberrations, but other polynomials, such as for example Taylor series or splines can also be used to mathematically describe a wavefront.

The Zernike expansion presents the aberrations in an orthogonal set of polynomials. It can be displayed in the form of a pyramid. Vertically each row represents a typical form of aberration; these are called (radial) orders. The top is called the zero order, which actually is no aberration but a constant that can be added for e.g. scaling. The second row (the first order) represents prismatic effects. Each presentation of an aberration is called a term. The prismatic effects are based vertical (Z-term 2, up or down) and horizontal (Z-term 3, in or out). Since the zero and first orders (Z-terms 1-3) are linked to specific visual defects, or to specific measurement conditions, these are usually not pictured. It starts to become interesting as of the second order. In the middle of the pyramid, defocus (Z-term 4) can be found. It is placed at the axis line of the pyramid. This is because defocus (spherical part of a refraction) is rotational symmetric (zero angular frequency). On both sides of defocus, the astigmatic (cylinder in the refraction) terms Z-3 and Z-5 can be found. These are special conditions of defocus because they work in one meridian only. Consequently these must be indicated with a direction (axis of the cylinder), Z-3 for oblique astigmatism and Z-5 for horizontal astigmatism. The third order aberrations include coma and trefoil, each has a direction, so no Z-term in this row at the middle. Next are 5 terms of the $4^{th}$ order. Spherical aberrations (Z-12) is rotational symmetric, the other terms (with a direction) are secondary astigmatism and tetra foil. For describing aberrations in optics the pyramid continues with many more orders and terms. Usually these are not present in the eye or are very low. Even within the 14 Z-terms as discussed not all terms are of equal importance to the eye. For the eye the second order aberrations are called "low order aberrations" and include the sphere and cylinder value of the refraction. Third orders and above are called "higher order aberrations".

According to different embodiments that can be combined:
the ophthalmic correction device of step a) comprises a corrective lens or a plurality of corrective lenses in the gaze direction of the eye(s); trial lenses may be used for this purpose;
step a) also comprises providing the wearer with an ophthalmic correction device so as to correct the higher order aberrations of the eye(s);
the ophthalmic correction device of step a) and/or of preceding claim comprises an adaptive optics visual simulator; according to an embodiment, the adaptive optics visual simulator is a Crx1™ apparatus commercialized by the Company Image Eyes;

the visual acuity value of an eye is measured thanks to a visual chart, as for example by using a Snellen chart or a Bailey-Lovie chart; according to another embodiment, the visual acuity value of an eye is measured thanks to optotype symbols, as for example by using Landolt-Cs or Tumbling or Snellen E.

According to an embodiment, the visual acuity values, $VA_L$, $VA_R$, are measured for each left (L) and right (R) eyes and wherein design parameters $DP_L$ and $DP_R$ are respectively used to calculate or select the design for the left and for the right eyes of the wearer.

According to another embodiment, the visual acuity values, $VA_L$, $VA_R$, are measured for each left (L) and right (R), wherein the dominant or directing eye is determined and wherein the design for the left and for the right eyes of the wearer is calculated or selected according to the visual acuity value of the dominant or directing eye.

According to an embodiment of the present invention, the spectacle ophthalmic lens is a spectacle progressive addition lens.

According to an embodiment of the present invention, the calculation or the selection of the design for the wearer is performed according to a progressive addition lens hardness parameter.

In the frame of the present invention, a "lens hardness parameter" has to be understood as a parameter suitable for characterizing ophthalmic lens peripheral aberrations management. Said aberrations management relates to the vision fields apertures in the far and near vision zones and thus to the variation degree of aberration along the ophthalmic lens periphery. According to non limiting examples, a lens hardness parameter is maximum astigmatism gradient on a lens surface, or maximum dioptric power gradient on a lens surface, or a combination thereof.

Progressive lens designs are broadly categorised as either "hard" type designs or "soft" type designs based on the distribution of power and astigmatism.

Hard lens designs concentrate the progressive optics into smaller regions of the lens surface, thereby expanding the areas of clear vision at the expense of elevating the gradients and overall magnitude of unwanted cylindrical power in the periphery.

Soft lens designs spread the progressive optics across larger regions of the lens surface, thereby reducing the gradients and overall magnitude of unwanted cylindrical power at the expense of narrowing the areas of clear vision.

A longer progressive corridor length with a relatively slow progression of addition power usually gives a soft lens design, while a shorter corridor length with a relatively rapid progression of addition power usually gives a hard lens designs.

Maximum power or astigmatism gradient may be considered as a main feature to characterize a lens design. Said gradient is normalized for an addition of 1 Diopter and the actual gradient of a progressive lens is multiplied by the desired addition value for the wearer.

According to non limiting examples, the gradient value of a soft design progressive lens is equal to or less than 0.05 Diopter per degree where the gradient value of a hard design progressive lens is equal or greater to 0.15 Diopter per degree.

According to embodiments of the present invention:

the calculation or the selection of the design for the wearer is performed so as to the lower is the visual acuity, the softer is the design for the wearer and accordingly the higher is the visual acuity, the harder is the design for the wearer;

a design parameter (DP1) is used to calculate or select the design for the wearer, where:

$$DP1 = EHC + (1-EHC) \times DP;$$

where:

EHC is the Eye-head coefficient;

DP is a design parameter calculated thanks to the visual acuity value, where DP=0 for a hard design and DP=1 for a soft design.

In the frame of the present invention, "Eye-head coefficient" is a coefficient suitable to characterize the relative amplitudes of movements respectively of the eyes and of the head of a wearer when the gaze direction of the wearer is changing. An eye-head coefficient can be measured for a wearer thanks to an "eye/head" movement coordination test.

According to an embodiment, the EHC is a function of angular deviation ($\alpha_T$) of the wearer's head divided by an angular eccentricity (E) of a target which the wearer is looking at. Said EHC is equal to 1 for a wearer who has only turned his head when looking at the target and equal to 0 for a wearer who has only turned his eyes when looking at the target.

According to an embodiment:

$$DP=0, \text{if } VA<VA_{min};$$

$$DP=1, \text{if } VA>VA_{max};$$

$$DP=(VA-VA_{min})/(VA_{max}-VA_{min}), \text{if } VA_{min} \leq VA \leq VA_{max};$$

wherein VA is the measured acuity value of the eye, $VA_{min}$ and $VA_{max}$ are respectively a minimum and a maximum visual acuity threshold value and are expressed in LogMAR unities.

According to an example regarding previous embodiment, $VA_{min}=-0.1$ LogMAR(12/10) and $VA_{max}=0.2$ LogMAR(6/10).

The method according to the invention can also be used to optimize the selection of an already existing lens design. In particular, it is possible to either use or not use a function allowing for a better fit with a prescribed correction in the whole of the visual field, or a function taking into account assembly parameters and mode of wear, depending on visual acuity.

The invention also relates to a method for manufacturing a spectacle ophthalmic lens for a wearer, comprising the following consecutive steps:

a) providing the wearer with an ophthalmic correction device so as to correct the low order (spherical and/or cylindrical) aberrations of an eye (the eyes) of the wearer if said aberrations are greater to 0.25 Diopter;

b) measuring the visual acuity value(s), VA, of the eye(s) of the wearer where the eye(s) of the wearer is (are) substantially free of low order aberrations;

c) calculating thanks to computer means a design of the spectacle ophthalmic lens or selecting a design in a spectacle ophthalmic lens design data base by adapting the management of residual astigmatism based on the measured visual acuity value(s) of the eye(s) of the wearer and thus providing a personalized optical system (OS) for the wearer;

d) providing a lens substrate;

e) manufacturing the spectacle ophthalmic lens according to the optical system (OS) corresponding to the calculated or selected design in step c).

According to different embodiments, said method for manufacturing incorporates the previously described features and the different embodiments of the preceding method for providing a spectacle ophthalmic lens to a wearer.

The invention also relates to a computer program product, comprising one or more stored sequences of instructions, that is accessible to a processor and which, when executed by the processor, causes the processor to carry out at least one of the steps of the different embodiments of the preceding methods.

The invention also relates to a computer-readable medium carrying one or more sequences of instructions of the preceding computer program product.

Unless specifically stated otherwise, as apparent from the following discussions, it is appreciated that throughout the specification discussions utilizing terms such as "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE SEVERAL VIEWS OF THE DRAWINGS

The features of the present invention, as well as the invention itself, both as to its structure and its operation, will be best understood from the accompanying non limiting drawings and examples, taken in conjunction with the accompanying description, in which:

FIG. 1 shows experimental results regarding the visual acuity derivative variation according to initial acuity values (expressed in LogMAR);

FIG. 2a shows a graphical representation of a method for measuring visual acuity;

FIG. 2b shows a schematic setup of the "Freiburg Visual Acuity Test"

DETAILED DESCRIPTION

Figure 3A:
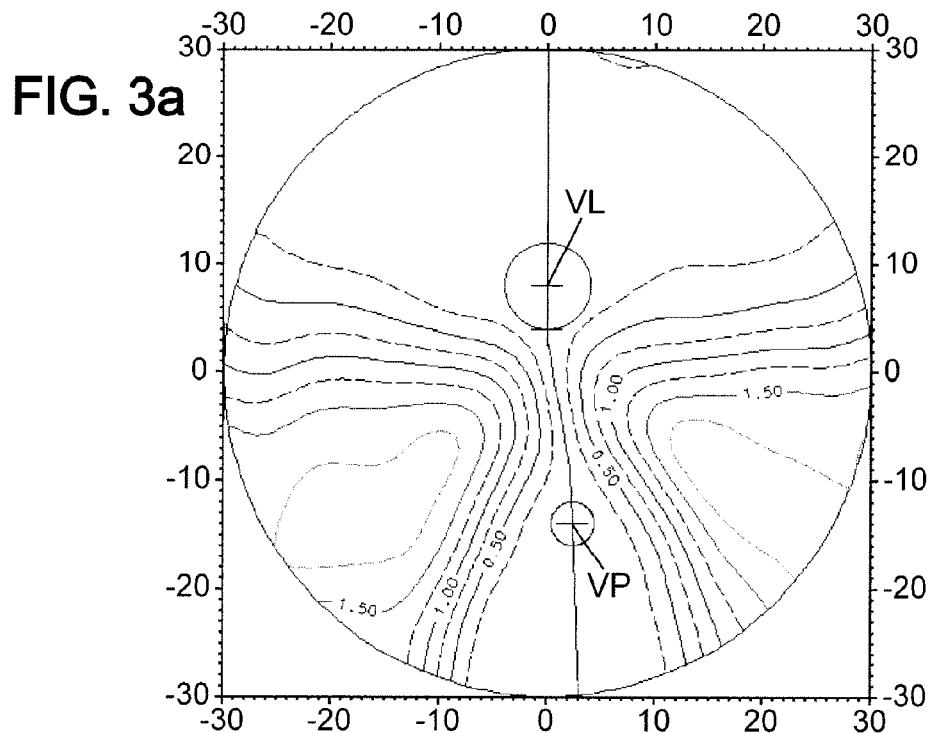
FIGS. 3a and b and FIGS. 4a and b show astigmatism distributions for different progressive addition lens designs.

FIG. 1 shows experimental data for a plurality of wearers of visual acuity derivative (varVA_cyl) variation according to initial acuity values $VA_{init}$, of the eye of each wearer, where the acuity values are expressed in LogMAR units. It has to be underlined that the visual acuity of a wearer is high when the value $VA_{init}$ is low and his visual acuity is low when the value $VA_{init}$ is high. The visual acuity derivative (varVA_cyl) is calculated as the slope of the resultant visual acuity variation as a function of added astigmatism power (added cylindrical power), where corresponding unit is LogMAR per Diopter. The initial acuity value, $VA_{init}$, is firstly measured for a wearer; a plurality of astigmatism values is then added for said wearer and the resultant visual acuity is measured for the wearer with said astigmatism value addition. According to the experiment made, the slope is calculated from a linear interpolation of 3 measurements of the resultant visual acuity obtained respectively with 3 different added astigmatism values of 0.25, 0.5 and 0.75 Diopter.

Visual acuity is measured according to the method disclosed when describing FIG. 2a.

The inventors have established that said visual acuity derivative (varVA_cyl) is highly dependant on the initial acuity values and a mean dependence straight lines 101, 102 can be plotted.

The coefficient of determination $R^2$ is calculated, where R is the Pearson correlation parameter.

Rectangles (each rectangle is an experimental result for a given wearer) and straight line 101 regard data where the eye of the wearer is substantially free of low order aberrations. In the present experiment the low aberrations have been corrected thanks to an adaptive optics visual simulator; trial lens can also be used for the same purpose. The coefficient of determination $R^2$ when calculating the straight line 101 is $R^2=0.32$.

Rhombus (each rhombus is an experimental result for a given wearer) and straight line 102 regard data where the eye of the wearer is substantially free of low order aberrations and where the eye of the wearer is also substantially free of higher order aberrations thanks to using an adaptive optics visual simulator. The coefficient of determination $R^2$ when calculating the straight line 102 is $R^2=0.44$.

One can thus determine that the eye of a wearer having a high initial acuity value, as for an example LogMAR ($VA_{init}$) comprised between −0.20 and −0.05, is very sensitive (important visual acuity derivative), whereas the acuity of the eye of a wearer having a low initial acuity value, as for an example LogMAR($VA_{init}$) comprised between 0.15 and 0.30, is of low sensitivity (low visual acuity derivative). Thanks to this teaching, one can advantageously provide a "hard design" spectacle ophthalmic lens to a wearer having a high initial acuity value and a "soft design" spectacle ophthalmic lens to a wearer having a low initial acuity value.

FIG. 2a shows a graphical representation of the method for measuring visual acuity used for determining the experimental data of FIG. 1. Said method is called the "Freiburg Visual Acuity Test" and has been disclosed in Bach M (1996) "The "Freiburg Visual Acuity Test"—Automatic measurement of visual acuity". Optometry and Vision Science 73:49-53. The "Freiburg Visual Acuity Test" is an automated procedure for self-administered measurement of visual acuity. Landolt-Cs are presented on a monitor in one of eight orientations. The subject presses one of eight buttons, which are spatially arranged on a response box according to the eight possible positions of the Landolt-C's gap. To estimate the acuity threshold, a best PEST (Probability Estimation of Sensory Threshold) procedure is employed, in which a psychometric function having a constant slope on a logarithmic acuity scale is assumed. Measurement terminates after a fixed number of trials. FIG. 2b shows a schematic setup of the "Freiburg Visual Acuity Test". When a Landolt-C, 20, appears on the screen 23, the subject 21 responds by pressing one of eight buttons 22 which are spatially arranged according to the direction of the C's gap. Immediately on button press there is visual feedback in form of a growing "pie", where a missing piece indicates the correct position of the Landolt-C's. After that, the next optotype size is presented, the size of which is set according to an optimized strategy. FIG. 2a shows a plot of the evaluation of the visual acuity for an eye. According to this example 24 Landolt-C's are presented to the wearer following previous steps. The size of the stimulus (St) is indicated on the ordinate axis and the number, N, of Landolt-C's presentation is indicated on the abscissa. The acuity threshold 202 is determined according to the PEST procedure. In the example of FIG. 2a the acuity threshold is 6.6/10 corresponding to an acuity value of 0.18 LogMAR.

FIGS. 3a and b and 4a and b show twice two examples of a design of progressive lenses, with a distribution of astigmatism typically adjusted to two categories of lens users, depending on the initial visual acuity of the wearer.

FIGS. 3a and b show two examples of a design of progressive lenses where the progression channel length is 18 mm.

Figure 4A:
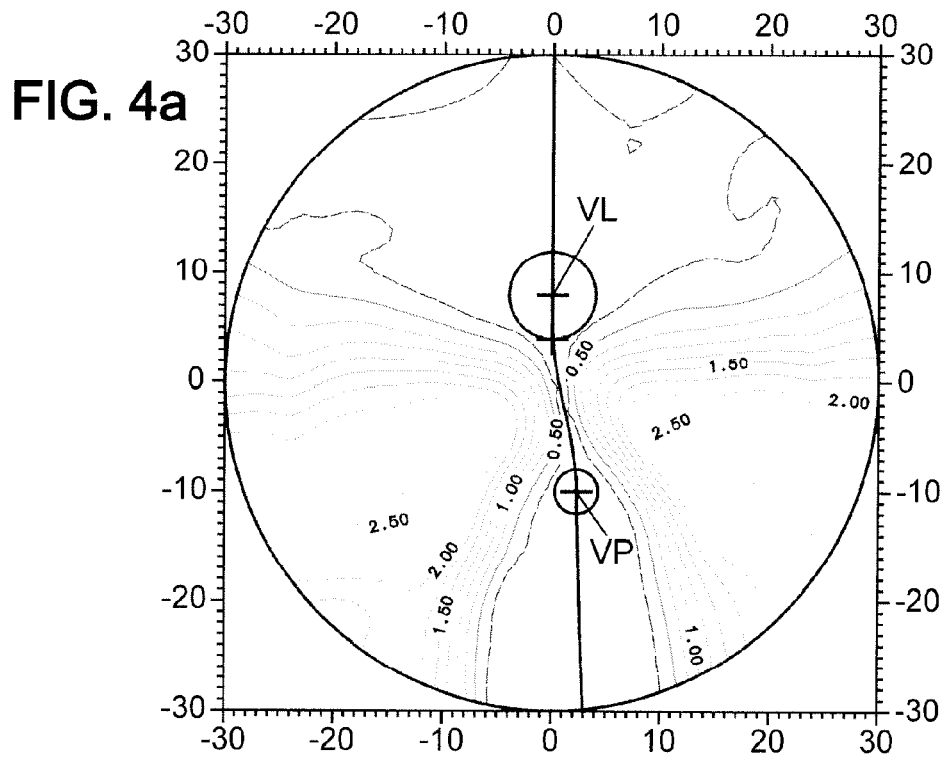

FIGS. 4a and b show two examples of a design of progressive lenses where the progression channel length is 14 mm.

FIGS. 3a and 4a show the astigmatism distribution of an example of designs adjusted for people whose initial visual acuity is high, preferably LogMAR($VA_{init}$) less than −0.05 (and more preferably less than −0.10).

Figure 3B:
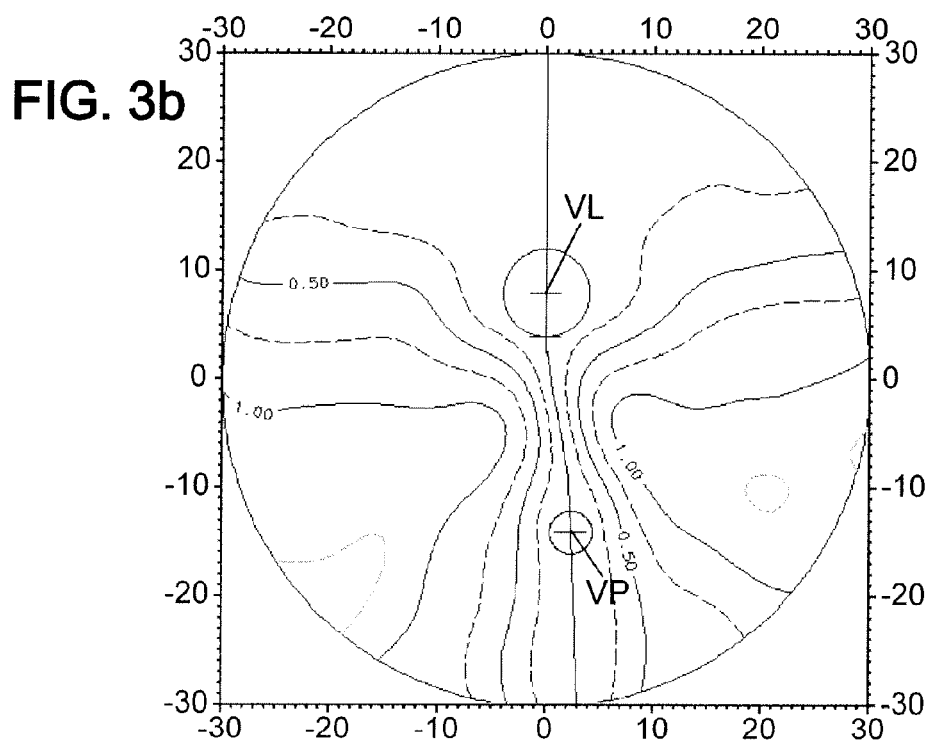
Figure 4B:
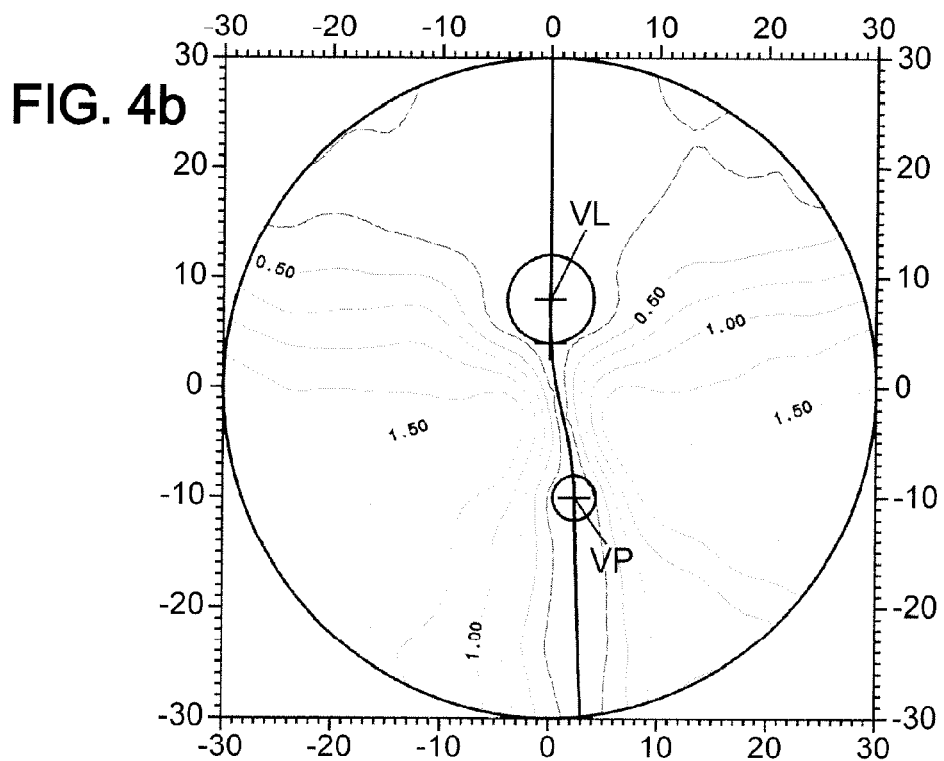

FIGS. 3b and 4b show the astigmatism distribution of an example of designs adjusted for people whose initial visual acuity is low, preferably LogMAR ($VA_{init}$) more than 0.10 (and more preferably more than 0.20).

Because higher levels of astigmatism in areas of far vision (or FV) and in areas of near vision (or NV) are tolerated, the designs of FIGS. 3b and 4b are much softer than the designs of FIGS. 3a and 4a, and therefore adapting to it will be much easier in terms of distortions.

Figure 5A:
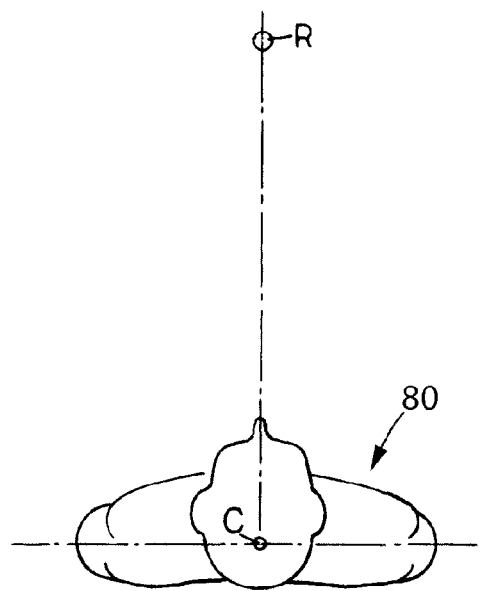
FIGS. 5a and b illustrate a principle of measurement of eyes and head movements for a spectacle lens wearer.
Figure 5B:
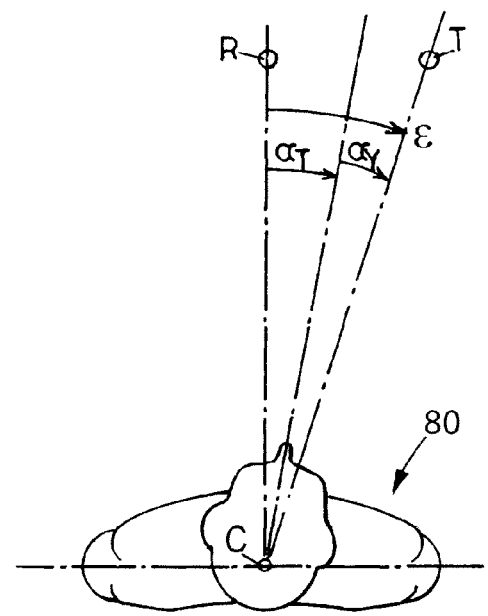

FIGS. 5a and b illustrate a principle of measurement of eyes and head movements for a spectacle lens wearer 80 when looking at a first target R situated in front of the wearer. The wearer firstly looks at said target R as shown on FIG. 5a and is then asked to look at a test target T without moving his shoulders as shown on FIG. 5b. The angular shift between both targets is called the eccentricity and referred as E. $\alpha_T$ is the head angular shift for the wearer 80 and $\alpha\gamma$ is his eyes angular shift whereas $E=\alpha_T+\alpha\gamma$. An eye-head coefficient EHC can be defined as a growing function of the ratio between $\alpha_T$ and E. According to an example EHC=$\alpha_T$/E. Details of said eyes and head measurement method are given in the patent publication WO 2008/104695 (namely on pages 5 and 6 of said document) which is hereby incorporated by reference.

The EHC determined for a wearer can then be used as a parameter used to calculate the DP2 design parameter disclosed above.

According to an embodiment of the present invention, the design of the spectacle ophthalmic lens for a wearer is selected among a plurality of spectacle ophthalmic lens designs according to the present invention and the optical system of the lens for the wearer is obtained by combining the chosen design and the prescription data for the wearer.

According to another embodiment of the present invention, a design is calculated for a wearer by adapting the management of residual astigmatism based on the measure of visual acuity of the eye of the wearer.

Said design calculation may be implemented according to design calculation methods known from a man skilled in the art where a calculation parameter is related to the visual acuity of the eye of the wearer.

According to a design calculation method suitable for the present invention, a first design is selected and then modified in order to take into account said visual acuity of the eye of the wearer. Optimization methods may be implemented where an optimization parameter is visual acuity of the eye of the wearer.

According to an embodiment, an optimization parameter is the design parameter DP1.

According to an embodiment of the present invention, the method for manufacturing a spectacle ophthalmic lens for a wearer can be implemented thanks to the method described in the International Patent Application numbered WO 2009/044080, filed on Sep. 11, 2008, in the name of ESSILOR INTERNATIONAL (Compagnie Générale d'Optique), where the value of "gain G qui a été calculée pour le porteur" (the gain factor G, which has been calculated for a wearer) would be equal to the design parameter DP1 of the present invention.

The invention has been described above with the aid of embodiments without limitation of the general inventive concept, in particular numerous calculation and/or manufacturing methods known from the man skilled in the art could be used in order to adapt the management of residual astigmatism according to the present invention.

The invention claimed is:

1. A method, at least partly implemented by one or more computers, for providing a spectacle ophthalmic lens to a wearer, the method comprising:
    a) providing the wearer with an ophthalmic correction device so as to correct a low order (spherical and/or cylindrical) aberration of an eye of the wearer if said aberration is greater than 0.25 Diopter;
    b) measuring a visual acuity value of the eye of the wearer or a binocular visual acuity value of both eyes of the wearer where the eye of the wearer is substantially free of low order aberrations or is corrected according to step a); and
    c) calculating, using the one or more computers, a design of the spectacle ophthalmic lens or selecting a design in a spectacle ophthalmic lens design data base by adapting management of residual astigmatism based on the measured visual acuity value of step b), wherein the residual astigmatism is a difference between an astigmatism of the lens and a prescribed astigmatism corresponding to the aberration of the eye.

2. The method of claim 1 wherein the ophthalmic correction device of step a) comprises a corrective lens or a plurality of corrective lenses in the gaze direction of the eye(s).

3. The method according to claim 1 wherein step a) also comprises providing the wearer with an ophthalmic correction device so as to correct higher order aberrations of the eye(s).

4. The method according to claim 1 wherein the ophthalmic correction device of step a) comprises an adaptive optics visual simulator.

5. The method according to claim 1, wherein the measuring includes measuring visual acuity values for the left and right eyes and wherein left and right design parameters are respectively used to calculate or select a left design for the left eye and a right design for the right eye of the wearer.

6. The method according to claim 1, wherein the measuring includes measuring visual acuity values for the left and right eyes of the wearer, the method including determining a dominant or directing eye and wherein the calculating or selecting includes calculating or selecting designs for the left and the right eyes of the wearer according to the visual acuity value of the dominant or directing eye.

7. The method according to claim 1, wherein the spectacle ophthalmic lens is a spectacle progressive addition lens.

8. The method according to claim 7 wherein the calculating or selecting of the design for the wearer is performed according to a progressive addition lens hardness parameter.

9. The method according to claim 8 wherein the calculating or selecting of the design for the wearer includes calculating or selecting a softer design if the visual acuity is lower, and calculating a harder design if the visual acuity is higher.

10. The method according to claim 7 wherein the calculating or selecting includes using a design parameter, DP1, to calculate or select the design for the wearer, where:

$$DP1 = EHC + (1-EHC) \times DP;$$

where:
EHC is an eye-head coefficient;
DP is a design parameter calculated according to the visual acuity value, where DP=0 for a hard design and DP=1 for a soft design.

11. The method of claim 10 wherein:

$$DP=0, \text{if } VA<VA_{min};$$

$$DP=1, \text{if } VA>VA_{max};$$

$$DP=(VA-VA_{min})/(VA_{max}-VA_{min}), \text{if } VA_{min} \leq VA \leq VA_{max};$$

wherein VA is the measured acuity value of the eye, $VA_{min}$ and $VA_{max}$ are respectively a minimum and a maximum visual acuity threshold value and are expressed in LogMAR units.

12. A method for manufacturing a spectacle ophthalmic lens for a wearer, the method comprising:
a) providing the wearer with an ophthalmic correction device so as to correct a low order (spherical and/or cylindrical) aberration of an eye of the wearer if said aberration is greater than 0.25 Diopter;
b) measuring a visual acuity value of the eye of the wearer where the eye of the wearer is substantially free of low order aberrations;
c) calculating, using the one or more computers, a design of the spectacle ophthalmic lens or selecting a design in a spectacle ophthalmic lens design data base by adapting management of residual astigmatism based on the measured visual acuity value of the eye of the wearer and thus providing a personalized optical system for the wearer;
d) providing a lens substrate; and
e) manufacturing the spectacle ophthalmic lens according to the optical system corresponding to the calculated or selected design in step c), wherein the residual astigmatism is a difference between an astigmatism of the lens and a prescribed astigmatism corresponding to the aberration of the eye.

13. A non-transitory computer-readable medium including one or more sequences of instructions that, when executed, cause one or more processors to implement at least one step of a method comprising:
a) providing the wearer with an ophthalmic correction device so as to correct a low order (spherical and/or cylindrical) aberration of an eye of the wearer if said aberration is greater than 0.25 Diopter;
b) measuring a visual acuity value of the eye of the wearer or a binocular visual acuity value of both eyes of the wearer where the eye of the wearer is substantially free of low order aberrations or is corrected according to step a);
c) calculating, using the one or more computers, a design of the spectacle ophthalmic lens or selecting a design in a spectacle ophthalmic lens design data base by adapting management of residual astigmatism based on the measured visual acuity value of step b), wherein the residual astigmatism is a difference between an astigmatism of the lens and a prescribed astigmatism corresponding to the aberration of the eye.

14. A non-transitory computer-readable medium including one or more sequences of instructions that, when executed, cause one or more processors to implement at least one step of a method comprising:
a) providing the wearer with an ophthalmic correction device so as to correct a low order (spherical and/or cylindrical) aberration of an eye of the wearer if said aberration is greater than 0.25 Diopter;
b) measuring a visual acuity value of the eye of the wearer where the eye of the wearer is substantially free of low order aberrations;
c) calculating, using the one or more computers, a design of the spectacle ophthalmic lens or selecting a design in a spectacle ophthalmic lens design data base by adapting management of residual astigmatism based on the measured visual acuity value of the eye of the wearer and thus providing a personalized optical system for the wearer;
d) providing a lens substrate; and
e) manufacturing the spectacle ophthalmic lens according to the optical system corresponding to the calculated or selected design in step c), wherein the residual astigmatism is a difference between an astigmatism of the lens and a prescribed astigmatism corresponding to the aberration of the eye.

* * * * *